(12) United States Patent
Hickey

(10) Patent No.: US 10,980,185 B2
(45) Date of Patent: Apr. 20, 2021

(54) AUTOMATIC NET WRAP REMOVER

(71) Applicant: John Edward Hickey, Moore, MT (US)

(72) Inventor: John Edward Hickey, Moore, MT (US)

( * ) Notice: Subject to any disclaimer, the term of this patent is extended or adjusted under 35 U.S.C. 154(b) by 0 days.

(21) Appl. No.: 16/935,957

(22) Filed: Jul. 22, 2020

(65) Prior Publication Data

US 2021/0084826 A1 Mar. 25, 2021

Related U.S. Application Data

(60) Provisional application No. 62/902,644, filed on Sep. 19, 2019.

(51) Int. Cl.
*A01F 29/00* (2006.01)
*A01F 29/10* (2006.01)

(52) U.S. Cl.
CPC ............ *A01F 29/005* (2013.01); *A01F 29/10* (2013.01)

(58) Field of Classification Search
CPC ............................... A01F 29/005; A01F 29/10
USPC ......................................................... 241/605
See application file for complete search history.

(56) References Cited

U.S. PATENT DOCUMENTS

| | | | | |
|---|---|---|---|---|
| 3,513,522 A * | 5/1970 | Thomson | ................ | A01F 12/14 83/89 |
| 5,282,713 A * | 2/1994 | Lande | ................ | B02C 18/0076 198/311 |
| 5,318,399 A * | 6/1994 | Marom | ................... | B65B 69/00 414/412 |
| 6,263,774 B1 * | 7/2001 | Rogness | ............ | A01D 87/0076 83/382 |
| 7,785,057 B2 * | 8/2010 | Noonan | ............... | A01D 87/127 414/412 |
| 8,021,095 B2 * | 9/2011 | Haugstad | ............. | A01D 87/127 414/412 |
| 8,528,843 B2 * | 9/2013 | Murphy | ............... | A01D 87/127 241/30 |
| 8,740,540 B2 * | 6/2014 | Daraie | ...................... | B66F 9/18 414/785 |
| 8,769,801 B2 * | 7/2014 | Lyman | ............... | B65B 69/0025 29/564.3 |
| 8,991,061 B2 * | 3/2015 | Neudorf | ................ | A01F 29/005 30/314 |
| 9,521,809 B2 | 12/2016 | Stam et al. | | |
| 10,022,723 B2 | 7/2018 | Graham et al. | | |
| 10,462,976 B2 * | 11/2019 | Sheedy | ................. | A01F 29/005 |
| 10,506,763 B2 * | 12/2019 | Sargent | ................ | A01D 87/127 |
| 10,647,463 B2 * | 5/2020 | Steenhoek | .......... | A01D 87/127 |
| 2002/0048501 A1 * | 4/2002 | Maclay | .................. | A01D 90/08 414/111 |
| 2003/0192416 A1 | 10/2003 | Platon et al. | | |
| 2006/0086857 A1 | 4/2006 | Lepage et al. | | |

(Continued)

*Primary Examiner* — Faye Francis
(74) *Attorney, Agent, or Firm* — Boudwin Intellectual Property; Daniel Boudwin

(57) ABSTRACT

An automatic net wrap remover is shown and described. The automatic net wrap remover includes a housing constructed of a base and a plurality of sidewalls. The housing has an interior volume. The base supports a belt system that will support a round hay bale and help to rotate the bale. A spindle is attached to the top of one of the plurality of sidewalls that will engage the hay bale. A blade is attached adjacent to the spindle that will cut the net wrapping of the hay bale.

19 Claims, 4 Drawing Sheets

(56) References Cited

U.S. PATENT DOCUMENTS

| | | | |
|---|---|---|---|
| 2009/0108606 A1* | 4/2009 | Noonan | A01F 29/005 294/104 |
| 2009/0202327 A1 | 8/2009 | Cory et al. | |
| 2011/0155830 A1* | 6/2011 | Murphy | A01F 29/005 241/101.73 |
| 2012/0311875 A1* | 12/2012 | Neudorf | A01F 29/005 30/294 |
| 2013/0149082 A1* | 6/2013 | Sheedy | A01D 87/127 414/412 |
| 2014/0230619 A1* | 8/2014 | Bayer | B26D 7/025 83/154 |
| 2017/0064908 A1* | 3/2017 | Sell | A01F 29/005 |
| 2019/0350134 A1* | 11/2019 | Guiet | A01D 87/127 |
| 2019/0350135 A1* | 11/2019 | Guiet | A01D 87/0076 |
| 2019/0357443 A1* | 11/2019 | Guiet | A01F 29/005 |

* cited by examiner

AUTOMATIC NET WRAP REMOVER

CROSS REFERENCE TO RELATED APPLICATIONS

This application claims the benefit of U.S. Provisional Application No. 62/902,644 filed on Sep. 19, 2019. The above identified patent application is herein incorporated by reference in its entirety to provide continuity of disclosure.

BACKGROUND OF THE INVENTION

The present invention relates to aiding in farming. More particularly, the present invention provides a device to enable farmers to better use a round hay bale.

Hay bales have gotten larger and harder to handle. One form of hay bales is a round bale. These bales are usually 4 or 5 feet in diameter and 4 or 5 feet long. This creates a very heavy and hard to work with object. These bales are wrapped in a plastic netting to hold the strand of grass in the bale. It can be difficult to remove this netting to get to the hay.

First, if a farmer decides to remove the net wrap pieces he or she must enter and exit a tractor several times for each bale to remove the net wrap, which can be problematic in inclement weather. If the farmer decides not to remove the netting the problems can be even worse. The net wrapping can be discharged into feed rows and be consumed by cattle. If the hay is used in bedding for animals, the net wrapping can be mixed in with fecal matter of the animals. This can cause discomfort for animals and further could get mixed into manure.

If mixed into manure it will most likely be spread over a field. This can lead to the wrapping being caught up in bearings and tight places on farm equipment. This causes problems for farmers and other agricultural professionals. This netting if stuck in machinery can lead to lengthy repairs of the machinery. In addition, accumulation of net wrap on a drum of a bale processor can result in a longer grinding time required by the bale processor to complete a cycle. These problems can cause wear and tear on the bale processor and the tractor. Keeping the drum of the bale processor free of net wrap ensures accurate and efficient processing of each bale in a timely manner.

Consequently, there is a need for an improvement in the art of farming using large round hay bales. The present invention substantially diverges in design elements from the known art while at the same time solves a problem many people face when unwrapping a round hay bale. In this regard the present invention substantially fulfills these needs.

SUMMARY OF THE INVENTION

The present invention provides an automatic net wrap remover wherein the same can be utilized for providing convenience for the user when using a large round hay bale. The automatic net wrap remover is comprised of a housing comprised of a base and a plurality if sidewalls, creating an interior volume. The base supports a belt system, wherein the belt system supports a round hay bale. A spindle is attached to the top of one of the plurality of sidewalls. A blade is attached adjacent to the spindle, wherein the blade is configured to cut the netting wrapping a hay bale.

Another object of the automatic net wrap remover is to have a hydraulic piston attached to the blade, wherein the blade is activated by the piston.

Another object of the automatic net wrap remover is to have a hydraulic motor connector to a sidewall.

Another object of the automatic net wrap remover is to have a chain connected to the hydraulic motor and to the spindle, wherein the chain will spin the spindle.

Another object of the automatic net wrap remover is to provide a spindle comprised of spikes that will engage the hay bale.

Another object of the automatic net wrap remover is to have a plurality of wheels attached to an underside of the base.

Another object of the automatic net wrap remover is to have a hinge attaching at least one of the plurality of sidewalls to the base, wherein the sidewall can be swung down to allow access to the interior volume.

Another object of the net wrap remover is to have a chain connecting to the hydraulic motor, wherein the chain will move the net wrap remover simultaneously as the conveyor belt putting the belt and remover in time with each other.

Another object of the automatic net wrap remover is to provide a serrated blade.

Another object of the automatic net wrap remover is to have a drawbar wherein the draw bar is configured to attach to a tractor hitch.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
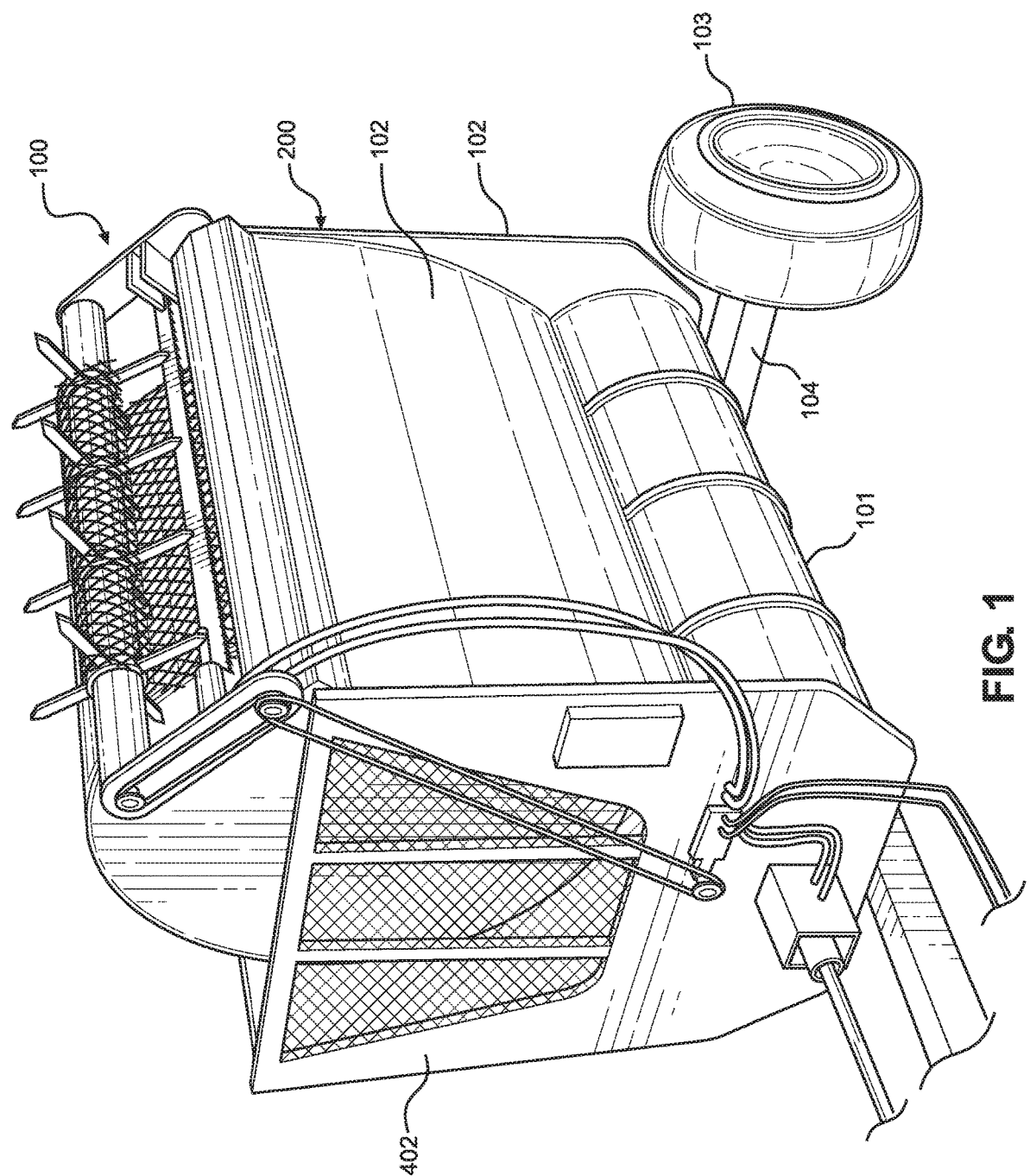
FIG. 1 shows a perspective view of an embodiment of the automatic net wrap remover attached to a hay bale grinder.

Reference is made herein to the attached drawings. Like reference numerals are used throughout the drawings to depict like or similar elements of the automatic net wrap remover. For the purposes of presenting a brief and clear description of the present invention, a preferred embodiment will be discussed as used for the automatic net wrap remover. The figures are intended for representative purposes only and should not be considered to be limiting in any respect.

Referring now to FIG. 1, there is shown a perspective view of an embodiment of the automatic net wrap remover attached to a hay bale grinder. In the shown embodiment the net wrap remover 100 is attached to a hay bale grinder 200. The hay bale grinder 200 includes a base 101 having a plurality of sidewalls 102 rising therefrom. In one embodiment at least one of the plurality of sidewalls 102 is a metal mesh sidewall. The base 101 and the plurality of sidewalls 102 create an interior volume. The interior volume is sized to house at least part of a round hay bale. In one embodiment a portion of the round hay bale will protrude through the opened top of the hay bale grinder 200.

In the shown embodiment, a plurality of wheels 103 is attached to the underside of the base 101. In one embodiment the wheels 103 are attached to the base via an axel 104. In another embodiment the wheels 103 are attached to the base using independent axels. The wheels 103 are configured to hold the weight of the hay bale grinder 200 and a round hay bale.

In one embodiment the net wrap remover 100 is attached to a top section of at least one of the sidewalls 102. The net wrap remover 100 is attached such that it is able to contact the exterior surface of a round hay bale. In one embodiment the net wrap remover 100 is clamped to the sidewall. In an embodiment the clamp is comprised of a first side a second side. The first side and the second side are held together via a plurality of bolts. In one embodiment the net wrap remover is hingedly attached to the sidewall 102. In a further embodiment, as described below in the description of FIG. 2, the net wrap remover 100 is able to raise and lower to allow the spikes and the blade to properly engage the hay bale as described below.

Figure 2:
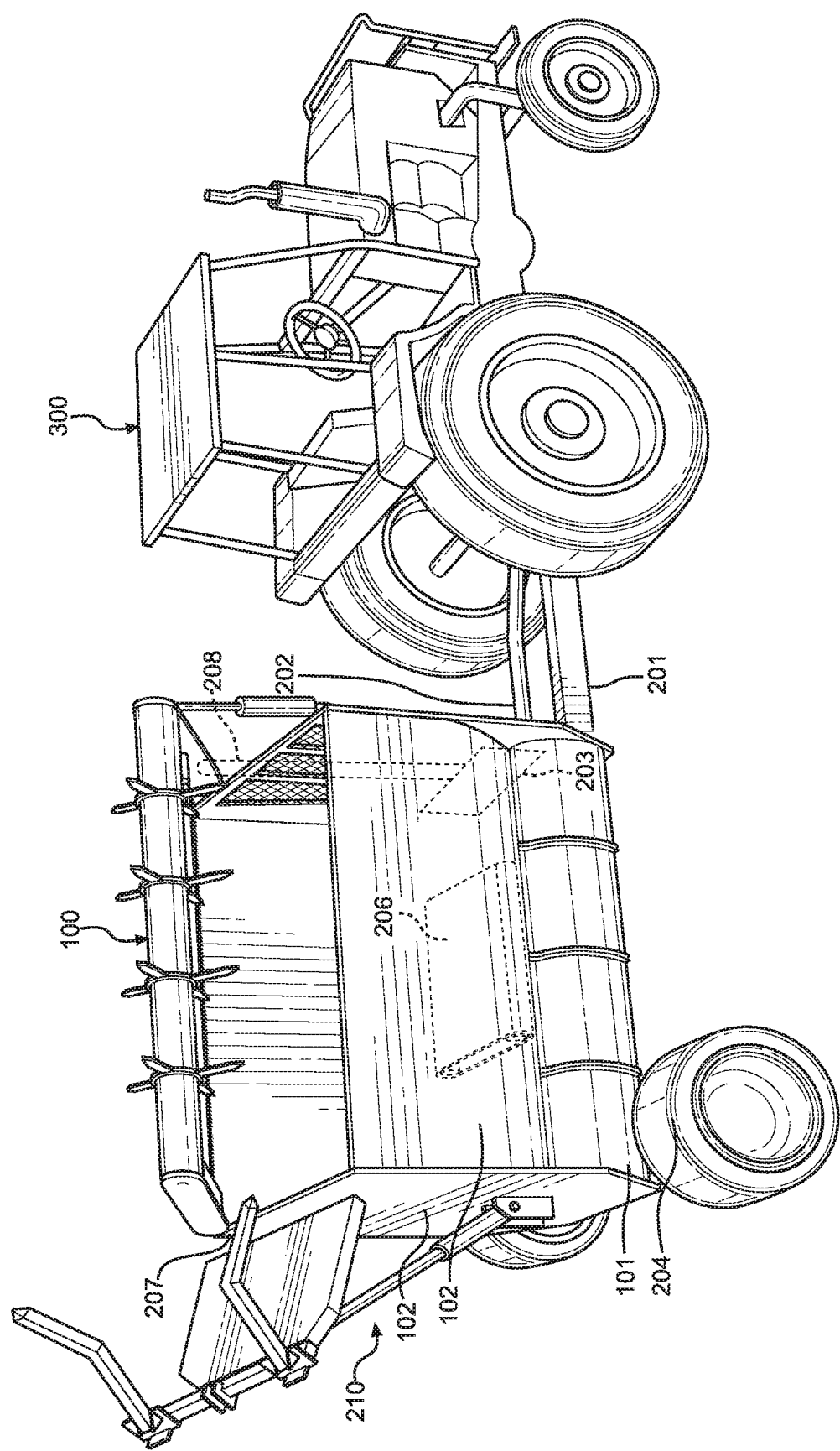
FIG. 2 shows a perspective view of an embodiment of the automatic net wrap remover attached to a hay bale grinder.

Referring now to FIG. 2, there is shown a perspective view of an embodiment of the automatic net wrap remover attached to a hay bale grinder. In the shown embodiment the hay bale grinder 200 is attached to a tractor 300. The hay bale grinder 200 is attached to the tractor 300 using a tongue 201 attached to the base of the hay bale grinder 200. The tongue 201 is configured to attached to a draw bar of a tractor 300. There is further a power take off connection or commonly a PTO connection 202 between the tractor 300 and the hay bale grinder 200. The PTO connection 202 will run a portion of the bale processor. There is further a hydraulic motor 203 located on the exterior of the front sidewall 102. The hydraulic motor 203 is configured to have various gears and sprockets connected thereto. This will allow different parts of the hay bale grinder 200 to connect and operate. The hydraulic motor 203 will operate the net wrap remover 100 and the hay bale grinder 200 as described herein.

In the shown embodiment, the hay bale grinder 200 has a belt 206 rotatably supported by the base 101. The belt 206 is configured to rotate a hay bale. In one embodiment the belt 206 is connected to the hydraulic motor 203 by a direct drive to the belt 206.

In one embodiment as described above the net wrap remover 100 is hingedly attached to a sidewall 102 of the hay bale grinder 200. This will allow the net wrap remover 100 to be raised and lowered to fit against the hay bale. In one embodiment there is a hydraulic cylinder 207 that will raise and lower the net wrap remover 100. The hydraulic cylinder 207 is connected at one end to a sidewall 102. At a second end, the hydraulic cylinder 207 is connected to the net wrap remover 100. The hydraulic cylinder 207 is fluidly connected to the tractor's hydraulic system such that it can be operated from the tractor 300.

The net wrap remover 100 is further connected to the hydraulic motor 203 via a chain 208. The chain 208 will be moved by the hydraulic motor 203 and thus operated the net wrap remover 100 as described below in the description of FIG. 3 and FIG. 4.

Figure 3:
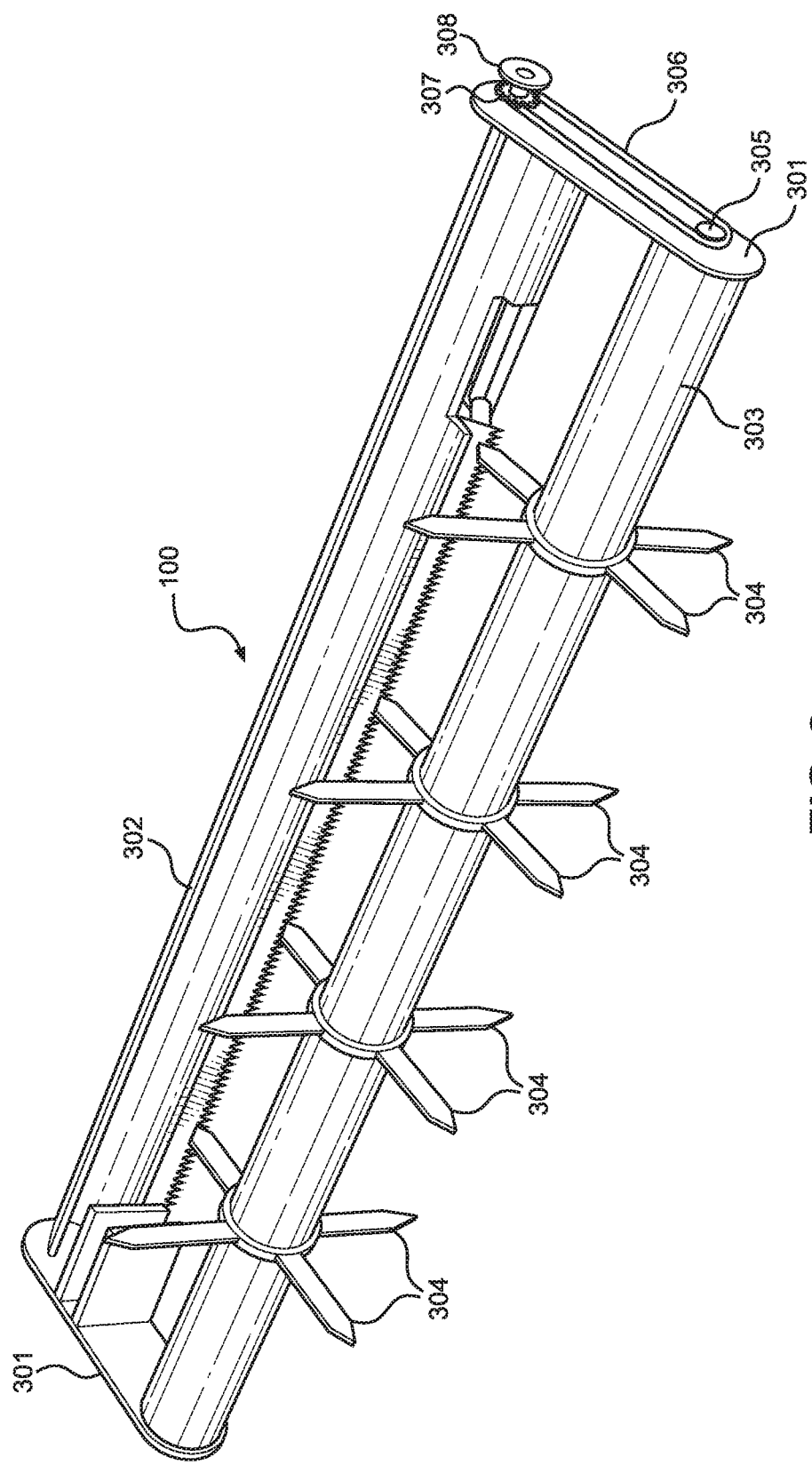
FIG. 3 shows a perspective view of an embodiment of the spindles for the automatic net wrap remover.

Referring now to FIG. 3, there is shown a perspective view of an embodiment of the spindles for the automatic net wrap remover. The net wrap remover 100 is comprised of a pair of sidewalls 301. In one embodiment there is a connection member 302 that is connected the pair of sidewalls 301 together. The connection member 302 may also function to protect a blade as described in FIG. 4.

A spindle 303 is rotatably connected to each wall of the pair of sidewalls 301. In one embodiment the spindle 303 has a plurality of spikes 304 located thereon. In one embodiment the spikes 304 spiral around the spindle 303. In another embodiment there are several "X" patterns formed using the spikes 304. The spikes 304 are configured to engage with a hay bale. The spikes 304 will rotate the hay bale as the spindle 303 is rotated. At the same time the spikes 304 will remove the net wrap from the hay bale.

The spindle 303 has a sprocket 305 attached to at least one end. The sprocket 305 is then attached to a chain 306. In one embodiment the chain 306 is directly attached to the hydraulic motor. This will allow the hydraulic motor to rotate the spindle 303. In another embodiment the chain 306 is attached to a second sprocket 307 located on the sidewall 301 near the connection to the hay bale grinder. This second sprocket 307 has an outer sprocket 308 attached thereto. The outer sprocket 308 is then attached to the hydraulic motor via a chain. This embodiment will enable the net wrap remover 100 to have its height adjusted without having to move a chain.

Figure 4:
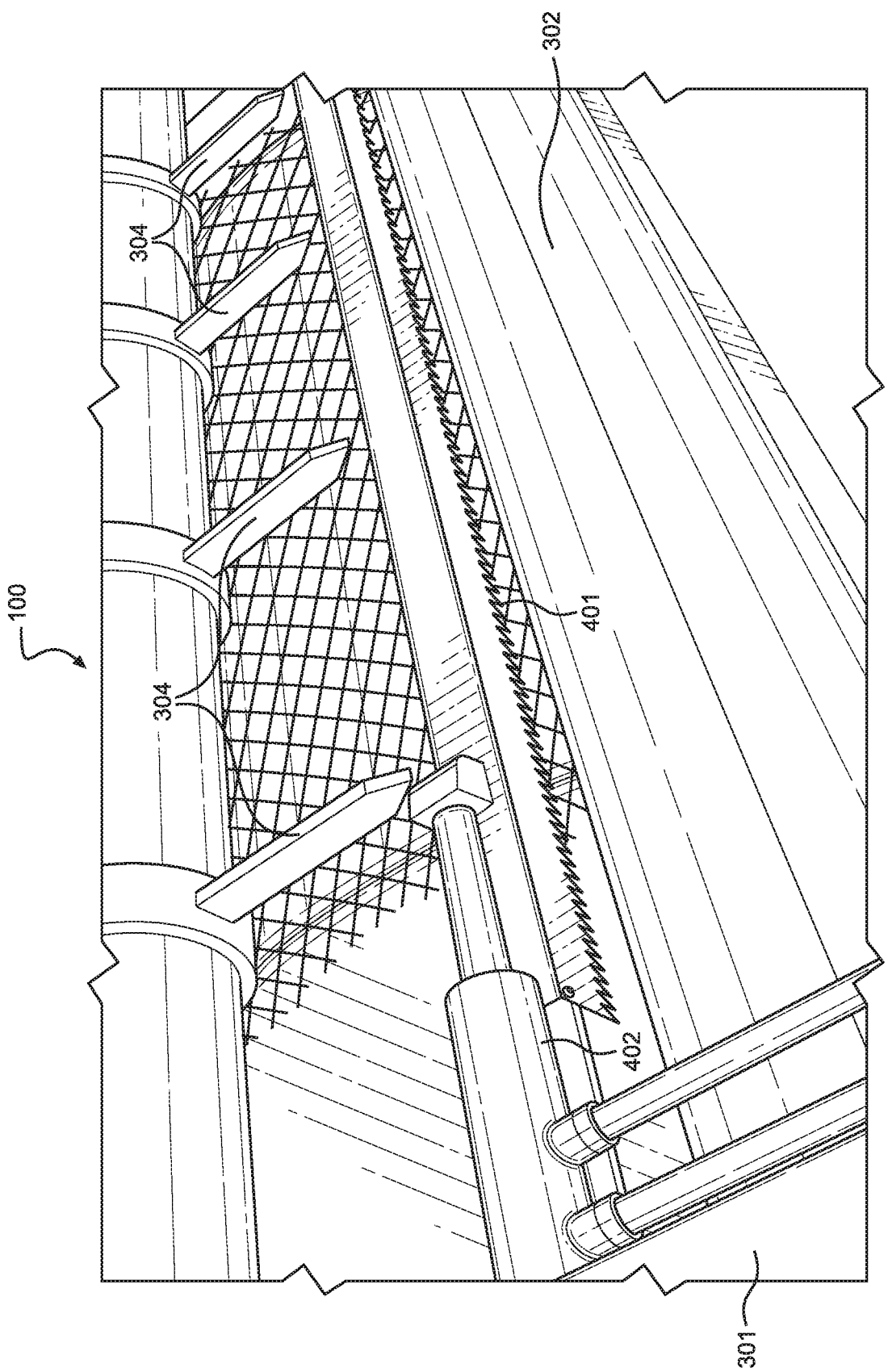
FIG. 4 shows a close-up view of an embodiment of the automatic net wrap remover blade.

Referring now to FIG. 4, there is shown a close-up view of an embodiment of the automatic net wrap remover blade. There is a blade 401 attached to the sidewalls 301 of the net wrap remover 100. The blade 401 is positioned such that it will be clear of the spikes 304 and still be able to engage the hay bale. The blade 401 is configured to cut the net wrap of the hay bale. In one embodiment the blade 401 is serrated. A serrated blade 401 will better ensure the net wrap is properly cut. Further, a serrated blade 401 will stay sharper longer.

In one embodiment the blade 401 is movably connected to the sidewalls 301. In one embodiment the blade 401 is moved by a hydraulic actuator 402. The hydraulic actuator 402 is connected at one end to the blade 401 and at a second end to a sidewall 301. The hydraulic actuator 402 is fluidly connected to the tractor's hydraulic system such that it can be operated from the tractor. The blade 401 will move in a parallel direction relative to the outer edge of the hay bale. This will allow the blade 401 to slice through the net wrapping of a hay bale without having to cut deep into the hay bale.

In some embodiments the connection member 302 is positioned adjacent to the blade 401. In one embodiment the connection member 302 is configured to shroud the blade 401 protecting it from harm. In another embodiment the connection member 302 is configured to act as a shield. This will prevent an individual from engaging the blade 401 accidentally.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A net wrap remover, the net wrap remover comprising:
a housing having a pair of sidewalls;
a spindle is rotatably connected to each of the sidewalls, wherein the spindle has a plurality of spikes located along the length;
a blade is movably attached between the sidewalls, wherein the blade is configured to cut a net wrap of a hay bale by moving along the net wrap in parallel direction relative to the outer edge of the hay bale.

2. The net wrap remover of claim 1, further comprising a hydraulic piston attached to the blade.

3. The net wrap remover of claim 1, further comprising a chain connected to a hydraulic motor and to the spindle, wherein the chain will spin the spindle.

4. The net wrap remover of claim 1, wherein the spindle is comprising of spikes located along the spindle that will engage the hay bale.

5. The net wrap remover of claim 1, further comprising a connection device attached to the pair of sidewalls.

6. The net wrap remover of claim 5, wherein the connection device is configured to secure the device to a hay bale grinder.

7. The net wrap remover of claim 2, wherein the hydraulic cylinder connected to at least one of the pair of sidewalls, wherein the hydraulic cylinder is configured to raise and lower the net wrap remover over a hay bale grinder.

8. The net wrap remover of claim 1, wherein the blade is serrated.

9. The net wrap remover of claim 5, wherein the connection device is comprised of a clamp;
the clamp has a first side and a second side;
the first side of the clamp and the second side of the clamp are connected together with a plurality of bolts.

10. A net wrap remover, the net wrap remover comprising:
a housing comprised of a base and a plurality of sidewalls, creating an interior volume;
the base supporting a belt system, wherein the belt system supports a round hay bale;
a spindle attached to the top of one of the plurality of sidewalls;
a blade movably attached adjacent to the spindle, wherein the blade is configured to cut the netting wrapping a hay bale by moving along the net wrap in parallel direction relative to the outer edge of the hay bale.

11. The net wrap remover of claim 10, further comprising a hydraulic piston attached to the blade.

12. The net wrap remover of claim 10, further comprising a hydraulic motor connected to a sidewall.

13. The net wrap remover of claim 12, further comprising a chain connected to the hydraulic motor and to the spindle, wherein the chain will spin the spindle.

14. The net wrap remover of claim 10, wherein the spindle is comprised of spikes that will engage the hay bale.

15. The net wrap remover of claim 10, further comprising a plurality of wheels attached to an underside of the base.

16. The net wrap remover of claim 10, further comprising a hinge attaching at least one of the plurality of sidewalls to the base, wherein the sidewall can be swung down to allow access to the interior volume.

17. The net wrap remover of claim 10, further comprising a chain connecting the hydraulic motor to the belt system, wherein the chain will move the belt system.

18. The net wrap remover of claim 10, wherein the blade is serrated.

19. The net wrap remover of claim 10, further comprising a drawbar wherein the drawbar is configured to attach to a tractor hitch.

* * * * *